United States Patent
Choi et al.

(10) Patent No.: US 7,289,395 B2
(45) Date of Patent: Oct. 30, 2007

(54) OPTICAL PICKUP DEVICE OF MICRO OPTICAL DISC DRIVE

(75) Inventors: In-Ho Choi, Gyeonggi-Do (KR); Sam-Nyol Hong, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 512 days.

(21) Appl. No.: 10/869,340

(22) Filed: Jun. 15, 2004

(65) Prior Publication Data

US 2004/0257928 A1    Dec. 23, 2004

(30) Foreign Application Priority Data

Jun. 17, 2003   (KR) .................. 10-2003-0039202

(51) Int. Cl.
*G11B 7/00* (2006.01)
(52) U.S. Cl. .................. 369/44.16; 369/44.19
(58) Field of Classification Search ............. 369/44.19
See application file for complete search history.

(56) References Cited

U.S. PATENT DOCUMENTS

| | | | |
|---|---|---|---|
| 6,704,256 B2 * | 3/2004 | Berg et al. ................ | 369/44.19 |
| 6,901,598 B1 * | 5/2005 | Freeman et al. ............ | 720/659 |
| 6,970,401 B2 * | 11/2005 | Raymond et al. ........ | 369/44.19 |
| 7,079,459 B2 * | 7/2006 | Watt et al. ................ | 369/47.39 |

* cited by examiner

*Primary Examiner*—Paul W. Huber
(74) *Attorney, Agent, or Firm*—Lee, Hong, Degerman, Kang & Schmadeka

(57) ABSTRACT

An optical pickup device of a micro optical disc drive comprises: a tracking actuator hinge-coupled to a deck rotatably in a tracking direction; a tracking arm coupled to the tracking actuator; a focusing arm connected to the tracking arm rotatably in a focusing direction; a connection member for connecting the tracking arm and the focusing arm so as to rotate the focusing arm; and a focusing actuator having a coil and a magnet at oppositely corresponding positions of the tracking arm and the focusing arm, for driving the focusing arm in a focusing direction.

10 Claims, 4 Drawing Sheets

OPTICAL PICKUP DEVICE OF MICRO OPTICAL DISC DRIVE

CROSS-REFERENCE TO RELATED APPLICATIONS

Pursuant to 35 U.S.C. § 119(a), this application claims the benefit of earlier filing date and right of priority of Korean Patent Application No. 2003-0039202, filed on Jun. 17, 2003, the contents of which is hereby incorporated by reference in its entirety.

BACKGROUND OF THE INVENTION

1. Field of the Invention

The present invention relates to an optical pickup device of a micro optical disc drive, and more particularly, to an optical pickup device of a micro optical disc drive capable of being slim.

2. Description of the Conventional Art

Generally, an optical disc drive is an apparatus for reproducing information recorded in a disc such as a compact disc (CD), a digital versatile disc (DVD), etc. or recording information in a disc.

Accordingly as portable electronic products are increased recently, a need for a micro optical disc drive for storing information in the electronic products is being increased.

In the micro optical disc drive, a general sled based method is not used but a tracking arm method is used at the time of applying an optical pickup unit.

In order to correctly read optical disc information by the optical pickup unit, an objective lens for irradiating light beam has to maintain a certain distance from a disc, that is, light beam of the objective lens has to be correctly focalized onto the disc. Controlling the objective lens in a perpendicular direction is called as a focusing, and controlling the objective lens in a horizontal direction along a track is called as a tracking.

FIG. 1 is a perspective view showing an optical pickup device of a micro optical disc drive in accordance with the conventional art.

As shown, the conventional optical pickup device 10 of a micro optical disc drive comprises: a tracking actuator 12 hinge 12a-coupled to a deck 11 rotatably in a horizontal direction; a swing arm 13 hinge 13a-coupled to the tracking actuator 12 rotatably in a vertical direction; an optical system 14 installed at the middle portion of the swing arm 13; an objective lens 15 installed at the end of the swing arm 13; and a focusing actuator 16 for driving the swing arm 13 in a focusing direction, that is, in a vertical direction.

The focusing actuator 16 is composed of: a magnet 16a fixed to the deck 11; and a coil 16b having a certain distance from the magnet 16a and fixed to one side of the swing arm 13, for generating a temporal electromagnetic force at the swing arm 13.

The coil 16b is positioned at the upper side of the magnet 16a with a certain gap, and a wire 16c is connected to the coil 16b.

In the conventional optical pickup device of a micro optical disc drive, the tracking actuator 12 is horizontally rotated centering around the hinge 12a thereby to track the swing arm 13.

At the same time, an electromagnetic force is generated by the focusing actuator 16, that is, an interaction between a current (not shown) that flows on the coil 16b through the wire 16c and a magnetic field of the magnet 16b. By the electromagnetic force, the swing arm 13 is vertically moved and performs a focusing thereby reproduce information stored in a disc or record new information in a disc.

At the time of performing the focusing, an intensity and a direction of the current that flows on the coil 16b are controlled thereby to control an intensity of the electromagnetic force.

However, in the conventional optical pickup device of a micro optical disc drive, since the coil is positioned at the upper side of the magnet, it was difficult to thin the optical pickup device.

SUMMARY OF THE INVENTION

Therefore, an object of the present invention is to provide an optical pickup device of a micro optical disc drive capable of being slim by improving a structure of a focusing actuator.

To achieve these and other advantages and in accordance with the purpose of the present invention, as embodied and broadly described herein, there is provided an optical pickup device of a micro optical disc drive comprising: a tracking actuator hinge-coupled to a deck rotatably in a tracking direction; a tracking arm coupled to the tracking actuator; a focusing arm connected to the tracking arm rotatably in a focusing direction; an optical system installed at the middle portion of the focusing arm; an objective lens installed at the end of the focusing arm; and a focusing actuator having a coil and a magnet at oppositely corresponding positions of the tracking arm and the focusing arm, for driving the focusing arm in a focusing direction.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Hereinafter, an optical pickup-device of a micro optical disc drive according to the present invention will be explained with reference to the attached drawings.

Figure 1:
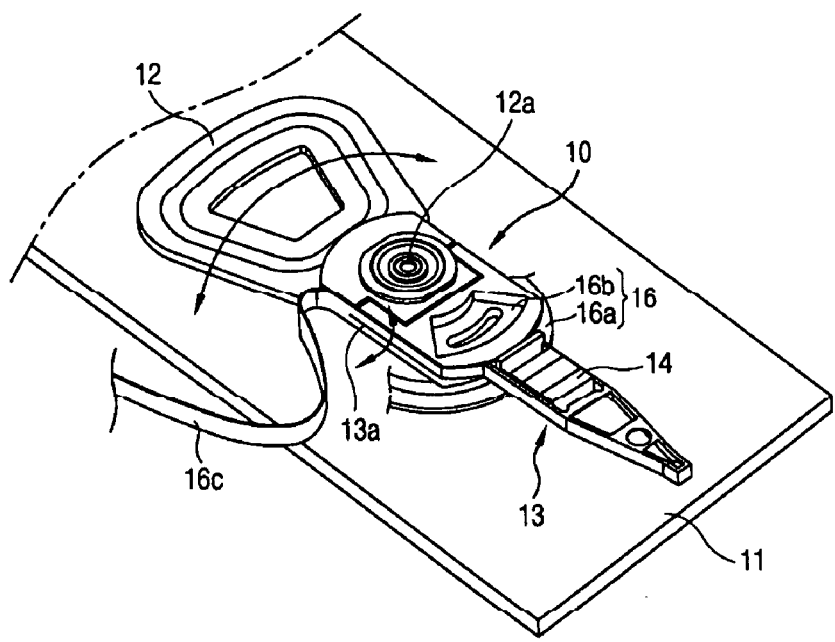
FIG. 1 is a perspective view showing an optical pickup device of a micro optical disc drive in accordance with the conventional art.
Figure 2:
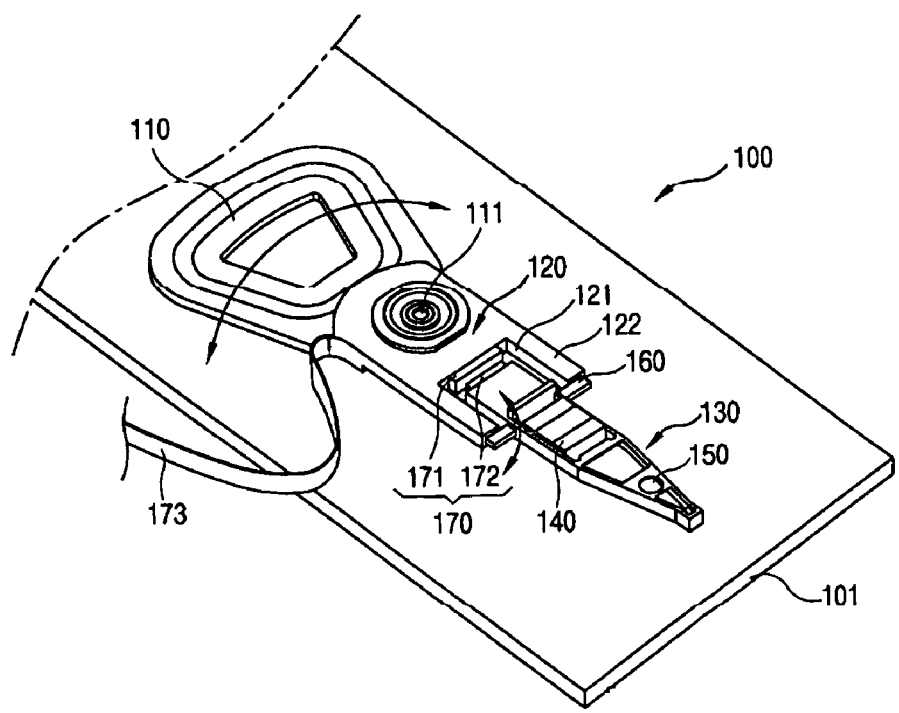
FIG. 2 is a perspective view showing an optical pickup device of a micro optical disc drive according to one embodiment of the present invention.
Figure 3:
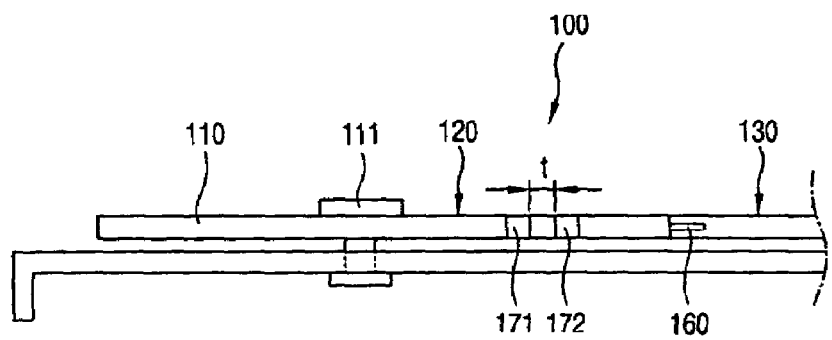
FIG. 3 is a lateral view of FIG. 2.
Figure 4:
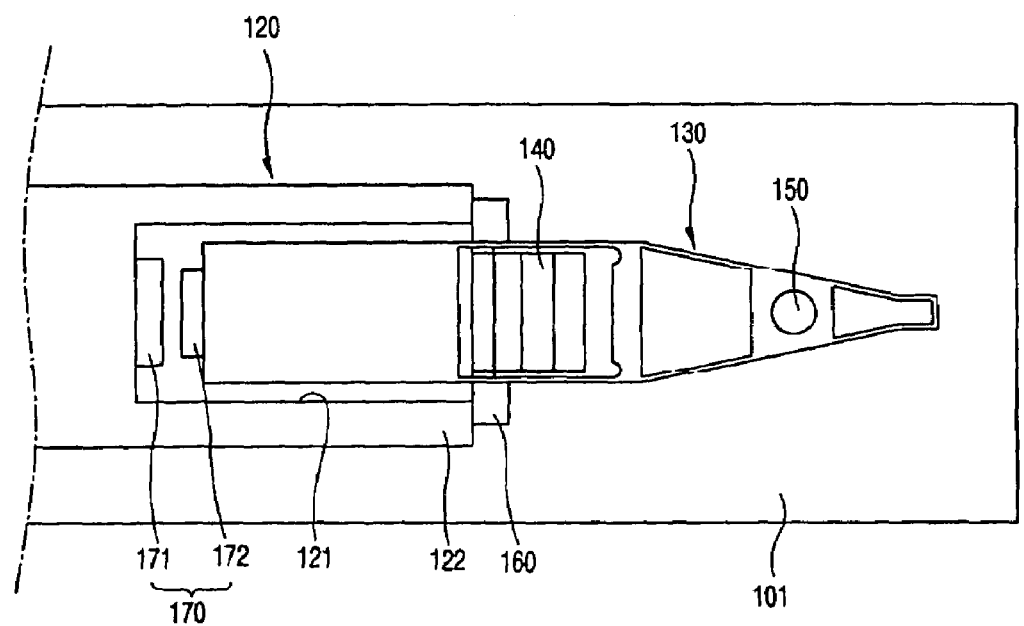
FIG. 4 is a plane view of FIG. 2.

FIG. 2 is a perspective view showing an optical pickup device of a micro optical disc drive according to one embodiment of the present invention, FIG. 3 is a lateral view of FIG. 2, and FIG. 4 is a plane view of FIG. 2.

As shown, an optical pickup device 100 of a micro optical disc drive according to one embodiment of the present invention comprises: a tracking actuator 5 hinge 111-coupled to a deck 101 rotatably in a tracking direction; a tracking arm 120 coupled to the tracking actuator 110; a focusing arm 130 connected to the tracking arm 120 rotatably in a focusing direction; an optical system 140 installed at the middle portion of the focusing arm 130; an objective lens 150 installed at the end of the focusing arm 130; a connection member 160 for connecting the tracking arm 120 and the focusing arm 130 so as to rotate the focusing arm 130; and a focusing actuator 170 having a coil 171 and a magnet 172 at oppositely corresponding positions of the tracking arm 120 and the focusing arm 130, for driving the focusing arm 130 in a focusing direction.

The connection member 160 is formed of a plate spring, and connects the tracking arm 120 and the focusing arm 130 so as to rotate the focusing arm 130.

The plate spring is formed of an elastic material, and has an elastic characteristic to restore to the original position at the time of being elastically deformed by a specific force.

The connection member 160 using the elastic characteristic of the plate spring not only serves as a hinge, a center for rotating the focusing arm 130 but also restores the focusing arm 130 to the original position.

An insertion groove 121 is formed at one end of the tracking arm 120, and a supporting portion 122 is formed at both sides of the insertion groove 121.

The end of the focusing arm 130 is fitted into the insertion groove 121, and the end of the tracking arm 120 faces the end of the focusing arm 130 with a certain gap 't' in a horizontal direction.

The coil 171 and the magnet 172 are respectively fixed to the end of the tracking arm 120 and the end of the focusing arm 130 with a certain gap. A wire 173 is connected to the coil 171, and a current flows through the wire 173.

Figure 5:
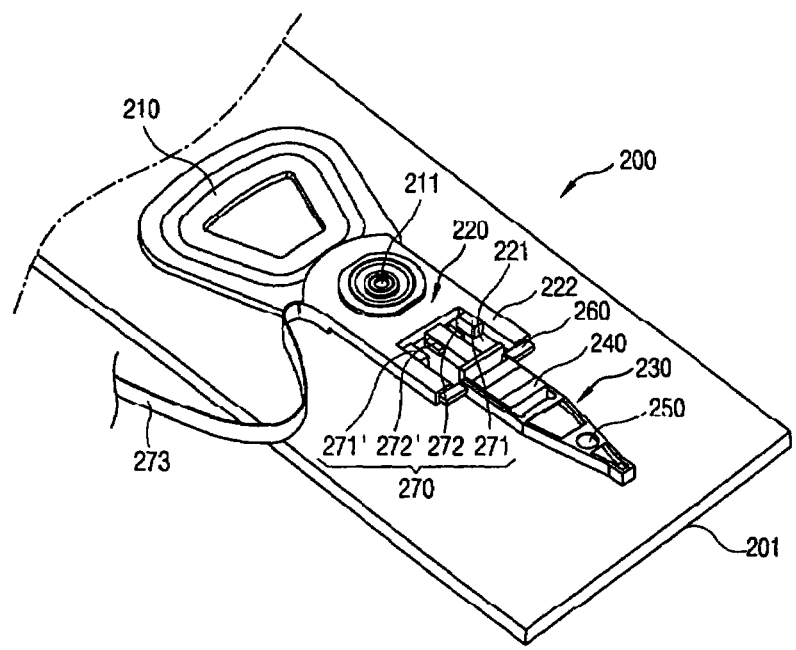
FIG. 5 is a perspective view showing an optical pickup device of a micro optical disc drive according to a second embodiment of the present invention.
Figure 6:
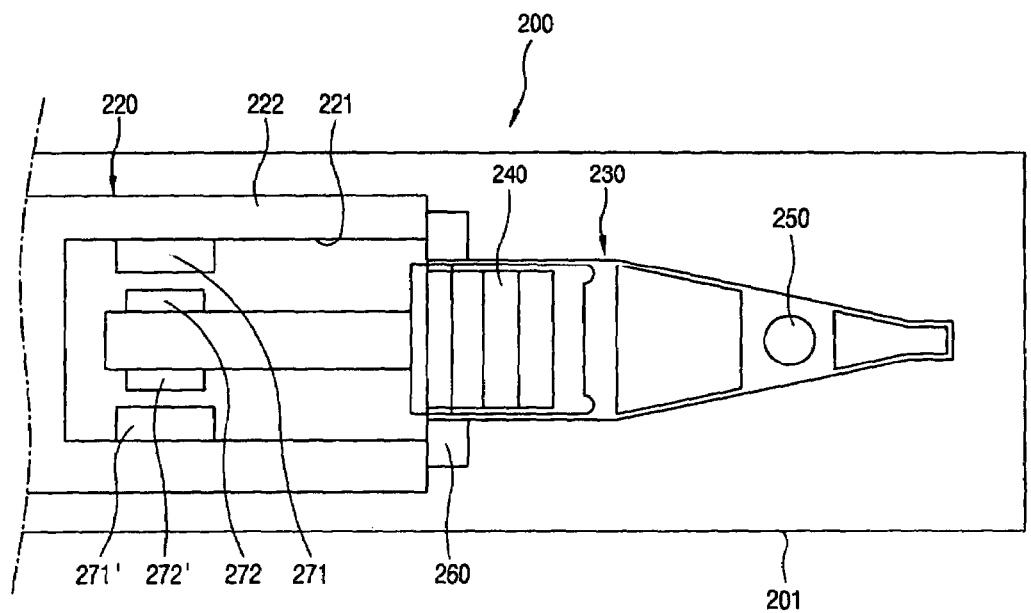
FIG. 6 is a plane view of FIG. 5.

FIG. 5 is a perspective view showing an optical pickup device of a micro optical disc drive according to a second embodiment of the present invention, and FIG. 6 is a plane view of FIG. 5.

As shown, the optical pickup device 200 of a micro optical disc drive according to the second embodiment of the present invention comprises: a tracking actuator 210 hinge 211-coupled to a deck 201 rotatably in a tracking direction; a tracking arm 220 coupled to the tracking actuator 210; a focusing arm 230 connected to the tracking arm 220 rotatably in a focusing direction; an optical system 240 installed at the middle portion of the focusing arm 230; an objective lens 250 installed at the end of the focusing arm 230; a connection member 260 for connecting the tracking arm 220 and the focusing arm 230 so as to rotate the focusing arm 230; and a focusing actuator 270 having a pair of coils 271 and 271' and a pair of magnets 272 and 272' at oppositely corresponding positions of the tracking arm 220 and the focusing arm 230 in a horizontal direction, for driving the focusing arm 230 in a focusing direction.

An insertion groove 221 is formed at one end of the tracking arm 220, and a supporting portion 222 is formed at both sides of the insertion groove 221.

The end of the focusing arm 230 is fitted into the insertion groove 221, and the end of the tracking arm 220 faces the end of the focusing arm 230 with a certain gap.

The coils 271 and the 272' are respectively fixed to both sides of the inner surface of the supporting portion 222. Also, the magnets 272 and 272' are respectively fixed to both side surfaces of the end of the focusing arm 230 to correspond to the coils 271 and 271'.

The optical pickup device 200 of a micro optical disc drive according to the second embodiment of the present invention has the same operation as the optical pickup device 100 shown in FIGS. 2 to 4. However, in the optical pickup device 200 of a micro disc drive according to the second embodiment of the present invention, more electro-magnetic force is generated with less current by the pair of coils 271 and 271' fixed to both sides of the inner surface of the supporting portion 222 and by the pair of magnets 272 and 272' fixed to both side surfaces of the end of the focusing arm 230 corresponding to the pair of coils 271 and 271', thereby performing a tracking more. efficiently.

Figure 7:
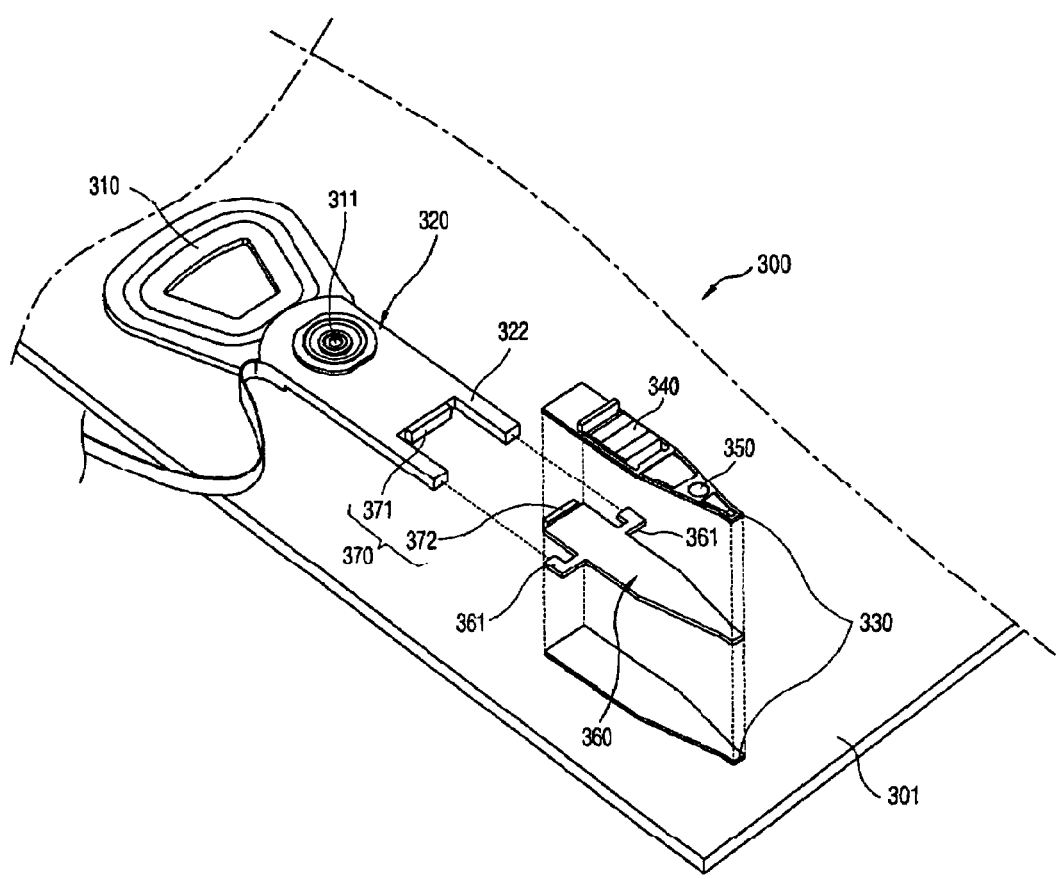
FIG. 7 is a disassembled perspective view showing an optical, pickup device of a micro optical disc drive according to a third embodiment of the present invention.

FIG. 7 is a perspective view showing an optical pickup device of a micro optical disc drive according to a third embodiment of the present invention.

As shown, the optical pickup device 300 of a micro optical disc drive according to the third embodiment of the present invention comprises: a tracking actuator 310 hinge 311-coupled to a deck 301 rotatably in a tracking direction; a tracking arm 320 coupled to the tracking actuator 310; a focusing arm 330 connected to the tracking arm 320 rotatably in a focusing direction; an optical system 340 installed at the middle portion of the focusing arm 330; an objective lens 350 installed at the end of the focusing arm 330; and a focusing actuator 370 installed at oppositely corresponding positions of the tracking arm 320 and the focusing arm 330, for driving the focusing arm 330 in a focusing direction.

In the optical pickup device 300 of a micro optical disc drive according to the third embodiment of the present invention, a plate spring member 360 is mounted in the focusing arm 330. Also, a hinge portion 361 fixed to a supporting portion 322 of the tracking arm by a general coupling means is formed at both sides of the plate spring member 360.

A magnet 372 is fixed to another side of the plate spring member 360, and a coil 371 is fixed to the end of the tracking arm 320 for correspondence to the magnet 372.

Hereinafter, operation of the optical pickup device of a micro optical disc drive according to the first embodiment of the present invention will be explained with reference to FIGS. 2 to 4.

As shown, the tracking arm 120 is horizontally rotated centering around the hinge 111 by the tracking actuator 110, and the focusing arm 130 connected to the tracking arm. 120 is also horizontally rotated thus to perform a tracking.

At the same time, a current (not shown) that flows on the coil 171 through the wire 173 interacts with a magnetic field of the magnet 172, so that the focusing arm 130 is rotated centering around the connection member 160 and performing a focusing. Herein, a rotation amount of the focusing arm 130 can be controlled by controlling an intensity and a direction of the current. Since the coil 171 and the magnet 172 are positioned at the same height, the optical pickup device can be slim.

As aforementioned, in the focusing actuator structure, the coil and the magnet face each other at the same height, thereby making the optical pickup device be thinner.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An optical pickup device of a micro disc drive comprising:
   a tracking actuator hinge-coupled to a deck rotatably in a tracking direction;
   a tracking arm coupled to the tracking actuator;
   a focusing arm connected to the tracking arm rotatably in a focusing direction;
   a connection member for connecting the tracking arm and the focusing arm so as to rotate the focusing arm; and
   a focusing actuator having a coil and a magnet at oppositely corresponding positions of the tracking arm and the focusing arm, for driving the focusing arm in a focusing direction,
   wherein the connection member is a plate spring.

2. The device of claim 1, wherein an insertion groove is formed at one end of the tracking arm, a supporting portion is formed at both sides of the insertion groove, an end of the focusing arm is fitted into the insertion groove, and an end of the tracking arm faces the end of the focusing arm with a certain gap.

3. The device of claim 2, wherein the coil and the magnet are respectively fixed to the end of the tracking arm and the end of the focusing arm.

4. The device of claim 2, wherein a pair of coils is fixed to an inner surface of the supporting portion, and a pair of magnets are fixed to the end of the focusing arm for correspondence to the coils.

5. An optical pickup device of a micro optical disc drive comprising:
   a tracking actuator hinge-coupled to a deck rotatably in a tracking direction;
   a tracking arm coupled to the tracking actuator;
   a focusing arm connected to the tracking arm rotatably in a focusing direction;
   an optical system installed at the middle portion of the focusing arm;
   an objective lens installed at the end of the focusing arm; and
   a focusing actuator installed at oppositely corresponding positions of the tracking arm and the focusing arm, for driving the focusing arm in a focusing direction,
   wherein the tracking arm and the focusing arm are connected to each other by a plate spring member that serves as a hinge.

6. The device of claim 5, wherein the focusing actuator is a coil fixed to one side of the tracking arm and a magnet fixed to one side of the focusing arm for correspondence to the coil.

7. An optical pickup device of a micro optical disc drive comprising:
   a tracking actuator hinge-coupled to a deck rotatably in a tracking direction;
   a tracking arm coupled to the tracking actuator;
   a focusing arm connected to the tracking arm rotatably in a focusing direction;
   a connection member for connecting the tracking arm and the focusing arm so as to rotate the focusing arm; and
   a focusing actuator having a coil and a magnet at oppositely corresponding positions of the tracking arm and the focusing arm, for driving the focusing arm in a focusing direction,
   wherein the connection member is a plate spring.

8. The device of claim 7, wherein an insertion groove is formed at one end of the tracking arm, a supporting portion is formed at both sides of the insertion groove, an end of the focusing arm is fitted into the insertion groove, and the end of the tracking arm faces the end of the focusing arm with a certain gap.

9. The device of claim 8, wherein the coil and the magnet are respectively fixed to the end of the tracking arm and the end of the focusing arm.

10. An optical pickup device of a micro optical disc drive comprising:
    a tracking actuator hinge-coupled to a deck rotatably in a tracking direction;
    a tracking arm coupled to the tracking actuator;
    a focusing arm connected to the tracking arm rotatably in a focusing direction;
    an optical system installed at the middle portion of the focusing arm;
    an objective lens installed at the end of the focusing arm;
    a connection member for connecting the tracking arm and the focusing arm so as to rotate the focusing arm; and
    a focusing actuator having a coil and a magnet at oppositely corresponding positions of the tracking arm and the focusing arm, for driving the focusing arm in a focusing direction,
    wherein the connection member is a plate spring.

* * * * *